United States Patent
Lin

(10) Patent No.: US 8,437,069 B2
(45) Date of Patent: May 7, 2013

(54) LUMINANCE ENHANCEMENT STRUCTURE FOR REFLECTIVE DISPLAY DEVICES

(75) Inventor: Craig Lin, San Jose, CA (US)

(73) Assignee: SiPix Imaging, Inc., Fremont, CA (US)

( * ) Notice: Subject to any disclaimer, the term of this patent is extended or adjusted under 35 U.S.C. 154(b) by 220 days.

(21) Appl. No.: 12/943,832

(22) Filed: Nov. 10, 2010

(65) Prior Publication Data

US 2011/0057927 A1 Mar. 10, 2011

Related U.S. Application Data

(63) Continuation-in-part of application No. 12/397,917, filed on Mar. 4, 2009.

(60) Provisional application No. 61/141,162, filed on Dec. 29, 2008, provisional application No. 61/035,646, filed on Mar. 11, 2008.

(51) Int. Cl.
*G02B 26/00* (2006.01)
*G02F 1/03* (2006.01)
*G02F 1/29* (2006.01)
*G09G 3/04* (2006.01)
*G09G 3/34* (2006.01)
*G02F 1/1343* (2006.01)

(52) U.S. Cl.
USPC ............ 359/290; 359/245; 359/316; 345/33; 345/107; 349/139

(58) Field of Classification Search .................. 359/296, 359/245, 253–254, 265, 290–291; 349/33; 345/107; 430/31–32
See application file for complete search history.

(56) References Cited

U.S. PATENT DOCUMENTS

| | | | |
|---|---|---|---|
| 4,083,626 A | 4/1978 | Miyahara et al. |
| 5,151,801 A | 9/1992 | Hiroshima |
| 6,144,430 A | 11/2000 | Kuo |
| 6,166,787 A | 12/2000 | Akins et al. |
| 6,277,263 B1 | 8/2001 | Chen |
| 6,327,013 B1 | 12/2001 | Tombling et al. |
| 6,556,261 B1 | 4/2003 | Krusius et al. |
| 6,565,729 B2 | 5/2003 | Chen et al. |
| 6,753,064 B1 | 6/2004 | Nakama et al. |
| 6,784,962 B2 | 8/2004 | Sumida et al. |
| 6,806,995 B2 | 10/2004 | Chung et al. |
| 6,940,569 B2 | 9/2005 | Tanaka et al. |
| 6,997,595 B2 | 2/2006 | Mi et al. |

(Continued)

FOREIGN PATENT DOCUMENTS

| JP | 2001-264819 | 9/2001 |
|---|---|---|
| WO | WO 2008/122927 | 10/2008 |
| WO | WO 2009/114361 | 9/2009 |

OTHER PUBLICATIONS

U.S. Appl. No. 12/837,350, filed Jul. 15, 2010, Sprague et al.

(Continued)

*Primary Examiner* — Dawayne A Pinkney
(74) *Attorney, Agent, or Firm* — Perkins Coie LLP.

(57) ABSTRACT

The present invention is directed to luminance enhancement structure for reflective display devices. The luminance enhancement structure comprises grooves and columns, wherein said grooves have a triangular cross-section and a top angle, and said grooves and columns are in alternating order and in a continuous form in one direction. The luminance enhancement structure not only can reduce the total internal reflection, but also especially can enhance the on-axis brightness of a display device.

15 Claims, 14 Drawing Sheets

U.S. PATENT DOCUMENTS

| | | |
|---|---|---|
| 7,061,569 B2 | 6/2006 | Yun et al. |
| 7,088,404 B2 | 8/2006 | Otake et al. |
| 7,160,017 B2 | 1/2007 | Lee et al. |
| 7,184,188 B2 | 2/2007 | Kamijima |
| 7,244,476 B2 | 7/2007 | Sumida et al. |
| 7,248,394 B2 | 7/2007 | Ding et al. |
| 7,286,197 B2 | 10/2007 | Kwon et al. |
| 7,294,866 B2 | 11/2007 | Liu |
| 7,332,066 B2 | 2/2008 | Chen et al. |
| 7,339,716 B2 | 3/2008 | Ding et al. |
| 7,342,556 B2 | 3/2008 | Oue et al. |
| 7,397,619 B2 | 7/2008 | Hwang et al. |
| 7,408,696 B2 | 8/2008 | Liang et al. |
| 7,463,317 B2 | 12/2008 | Takizawa et al. |
| 7,543,973 B2 | 6/2009 | Shimura |
| 7,564,519 B2 | 7/2009 | Takizawa |
| 7,576,914 B2 | 8/2009 | Goto |
| 7,612,846 B2 | 11/2009 | Takizawa et al. |
| 7,638,808 B2 | 12/2009 | Owen et al. |
| 7,667,785 B2 | 2/2010 | Van Gorkom et al. |
| 7,693,389 B2 | 4/2010 | Kamijima |
| 7,830,592 B1 | 11/2010 | Sprague et al. |
| 2001/0006409 A1 | 7/2001 | Lee |
| 2001/0026347 A1 | 10/2001 | Sawasaki et al. |
| 2001/0026445 A1 | 10/2001 | Naghi et al. |
| 2002/0033927 A1 | 3/2002 | Mun et al. |
| 2002/0057413 A1 | 5/2002 | Sumida et al. |
| 2003/0165016 A1 | 9/2003 | Whitehead et al. |
| 2003/0234900 A1 | 12/2003 | Kim |
| 2004/0223100 A1 | 11/2004 | Kotchick et al. |
| 2005/0003108 A1 | 1/2005 | Sumida et al. |
| 2005/0041311 A1 | 2/2005 | Mi et al. |
| 2005/0140846 A1 | 6/2005 | Lubart et al. |
| 2005/0141844 A1 | 6/2005 | Olczak |
| 2006/0034099 A1 | 2/2006 | Yang et al. |
| 2006/0055627 A1 | 3/2006 | Wilson |
| 2006/0103779 A1 | 5/2006 | Amemiya et al. |
| 2006/0291247 A1 | 12/2006 | Kao et al. |
| 2007/0063965 A1 | 3/2007 | Kawai |
| 2007/0152592 A1 | 7/2007 | Kim et al. |
| 2007/0160811 A1 | 7/2007 | Gaides et al. |
| 2007/0200975 A1 | 8/2007 | Kamijima |
| 2007/0253072 A1 | 11/2007 | Mullen et al. |
| 2008/0012034 A1 | 1/2008 | Thielen et al. |
| 2009/0097273 A1 | 4/2009 | Chang |
| 2009/0231245 A1 | 9/2009 | Lin |
| 2010/0141573 A1 | 6/2010 | Lin |
| 2010/0177396 A1 | 7/2010 | Lin |
| 2010/0182351 A1 | 7/2010 | Lin |
| 2010/0225999 A1 | 9/2010 | Lin et al. |
| 2010/0271407 A1 | 10/2010 | Ho et al. |
| 2011/0043894 A1 | 2/2011 | Sprague et al. |

OTHER PUBLICATIONS

U.S. Appl. No. 12/843,396, filed Jul. 26, 2010, Sprague et al.
U.S. Appl. No. 12/323,315, filed Nov. 25, 2008, Sprague et al.

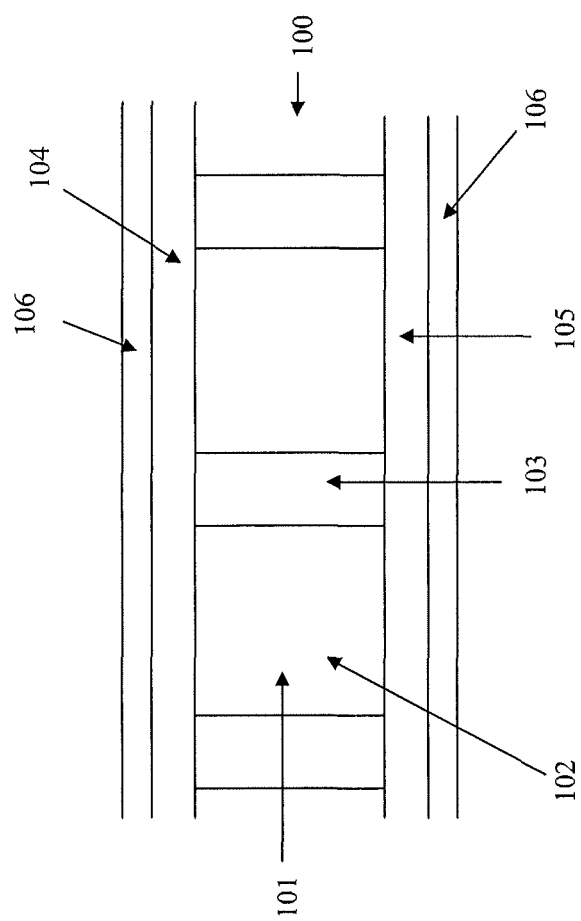

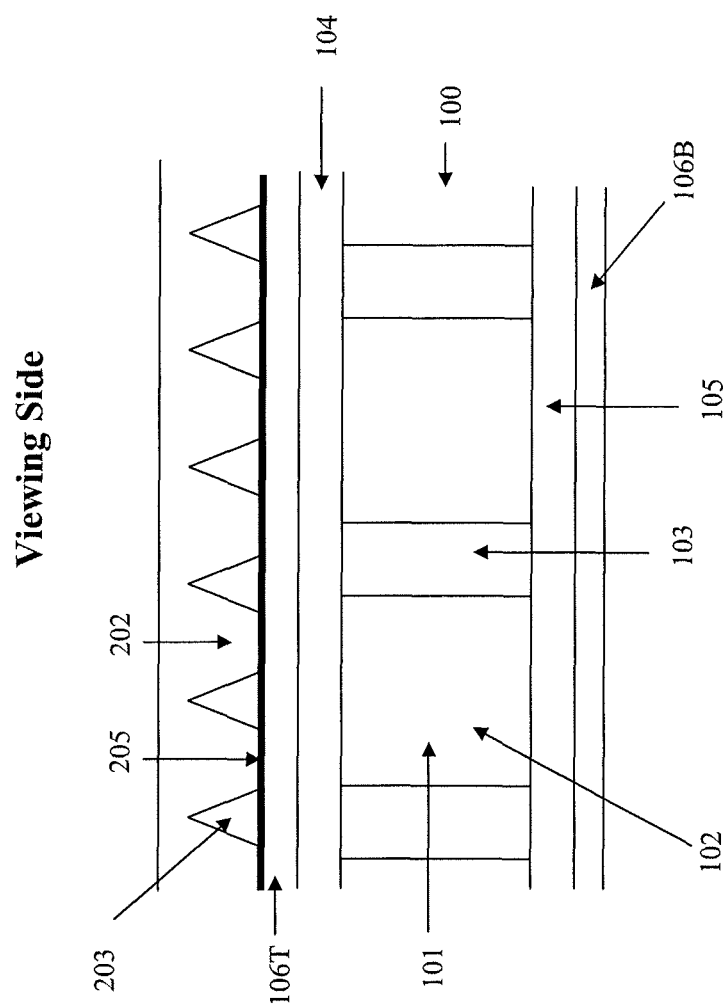

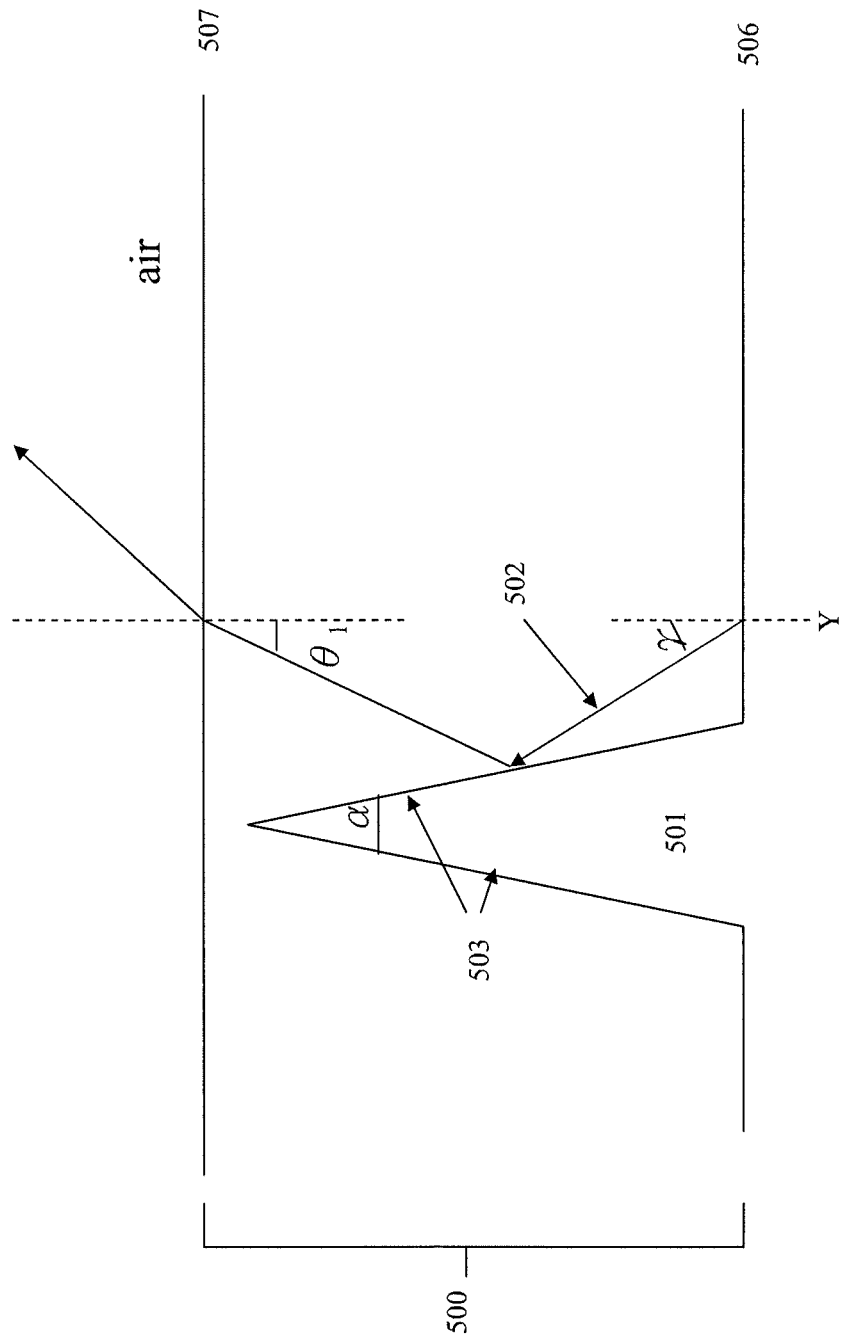

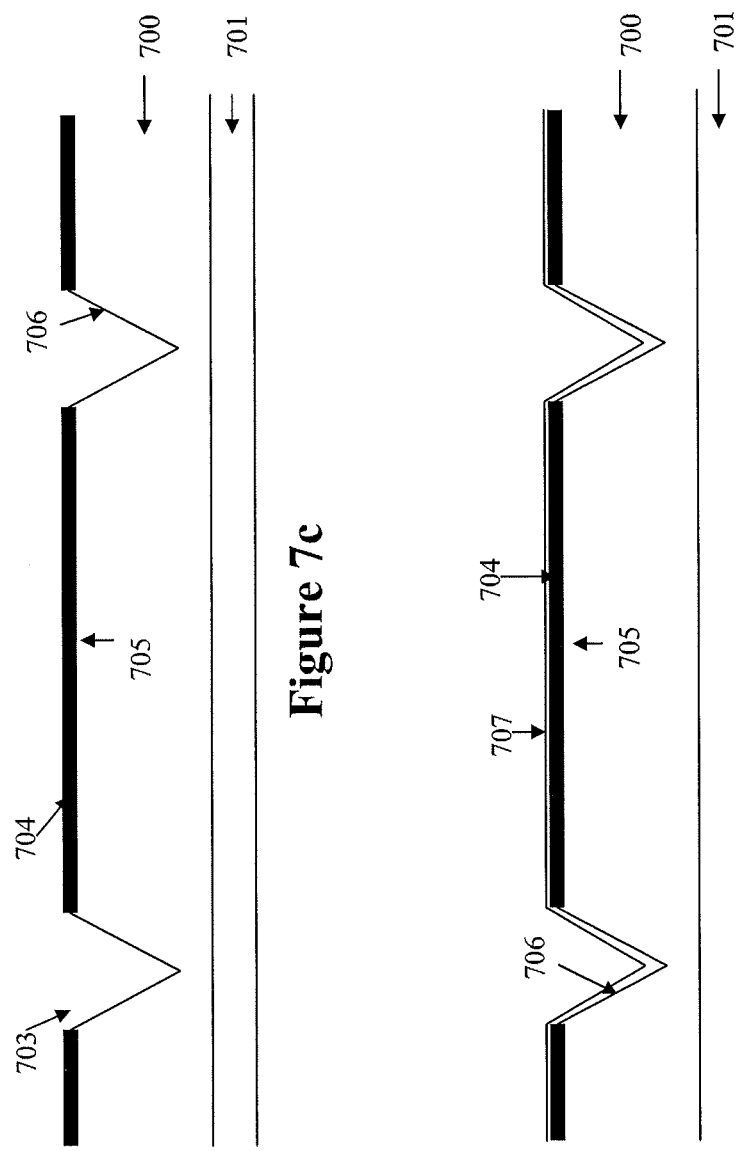

LUMINANCE ENHANCEMENT STRUCTURE FOR REFLECTIVE DISPLAY DEVICES

This application is a continuation-in-part of U.S. patent application Ser. No. 12/397,917, filed on Mar. 4, 2009, which claims the benefit of U.S. Provisional Application Nos. 61/141,162, filed Dec. 29, 2008, and 61/035,646, filed Mar. 11, 2008, which are incorporated herein by reference in their entirety.

FIELD OF THE INVENTION

The present invention is directed to a luminance enhancement structure for reflective display devices. The structure not only can reduce total internal reflection, but also can further enhance the on-axis brightness of a display device.

BACKGROUND OF THE INVENTION

The lack of satisfactory brightness is often a concern for electrophoretic display devices. Total internal reflection inevitably would occur with electrophoretic display devices because a display device usually has components of a high refractive index. Due to the component having a higher refractive index (e.g., about 1.5) than the air (which has a refractive index of about 1) surrounding the display panel, some of the scattering light from the display panel may reflect back to the display device by total internal reflection. This total internal reflection phenomenon may result in a loss of about 30-50% of the scattering light, thus causing reduction in brightness of the display device.

The Lambertian reflectance which is part of the nature of electrophoretic displays is beneficial for certain display applications. This is so because it allows viewing of a display panel at all angles, with almost the same brightness. However, the Lambertian reflectance is not important for all display applications. For example, for an e-reader, the viewers would tend to view the e-reader display within a certain angle, typically at normal angle of incidence to the display. In other words, the off-axis brightness of an e-reader is less important than the on-axis brightness. Therefore, it might be beneficial in such a case to trade the off-axis brightness for improved on-axis brightness.

SUMMARY OF THE INVENTION

The first aspect of the present invention is directed to a luminance enhancement structure which comprises grooves and columns wherein the grooves have a triangular cross-section and a top angle, the grooves and columns are in alternating order and in a continuous form in one direction.

In the first aspect of the invention, in one embodiment, the surface of the grooves is uncoated. In one embodiment, the top angles of the grooves are substantially equal. In one embodiment, the top angles are in the range of about 5° to about 50°. In one embodiment, the top angles are in the range of about 20° to about 40°. In one embodiment, the space within the grooves is filled with air or a low refractive index material. In one embodiment, the structure is formed from a material having a refractive index of about 1.4 to about 1.7. In one embodiment, the structure has an angle β which is smaller than the critical angle at the boundary between the top surface of the luminance enhancement structure and air, which angle β is the angle formed at the intersection of (i) the line connecting the top point of a first groove to the edge of the base of an adjacent groove wherein said edge of the base of the adjacent groove is the closest to the first groove and (ii) the normal axis of the top surface of the column.

The second aspect of the invention is directed to a reflective display assembly, which comprises
 (a) a display panel comprising display cells and a top substrate layer on the viewing side of the display device; and
 (b) a luminance enhancement structure on top of the display panel on the viewing side of the display device, which luminance enhancement structure comprises grooves and columns wherein the grooves have a triangular cross-section and a top angle, the grooves and columns are in alternating order and in continuous form in one direction.

In the second aspect of the invention, in one embodiment, the top angles of the grooves are substantially equal. In one embodiment, the columns have a top surface which is in optical contact with said top substrate layer. In one embodiment, the top substrate layer has a thickness in the range of about 1 µm to about 175 µm. In one embodiment, the top substrate layer has a thickness in the range of about 1 µm to about 25 µm. In one embodiment, the top angles are in the range of about 5° to about 50°. In one embodiment, the top angles are in the range of about 20° to about 40°. In one embodiment, the surface of the grooves is uncoated. In one embodiment, the space within the grooves is filled with air or a low refractive index material. In one embodiment, the luminance enhancement structure comprises an angle β which is smaller than the critical angle at the boundary between the top surface of the luminance enhancement structure and air, which angle β is the angle formed at the intersection of (i) the line connecting the top point of a first groove to the edge of the base of an adjacent groove wherein said edge of the base of the adjacent groove is the closest to the first groove and (ii) the normal axis of the top surface of the column. In one embodiment, the ratio of the width of the top surface of the columns to the distance between the luminance enhancement structure and the top of the display fluid is at least about 2. In one embodiment, the display assembly further comprises a common electrode layer and a backplane.

The reflective display assembly of the present invention may further comprise color filters.

The luminance enhancement structure increases the overall reflectance by reducing the total internal reflection. As a result, the brightness of a display device is increased. Moreover, the off-axis brightness is partially reflected to the on-axis angle, providing an even more pronounced enhancement within the ±20° viewing angle.

Furthermore, the structure can be fabricated by a cost effective roll-to-roll manufacturing process.

BRIEF DISCUSSION OF THE DRAWINGS

FIG. 1 depicts a cross-section view of a display device.

FIG. 3 depicts a cross-section view of the luminance enhancement structure on the viewing side of a display device.

FIGS. 5a-5c illustrate the dimensions of a luminance enhancement structure.

FIGS. 7a-7g show an example of how the luminance enhancement structure is fabricated.

DETAILED DESCRIPTION OF THE INVENTION

I. Definitions

Figure 2A:
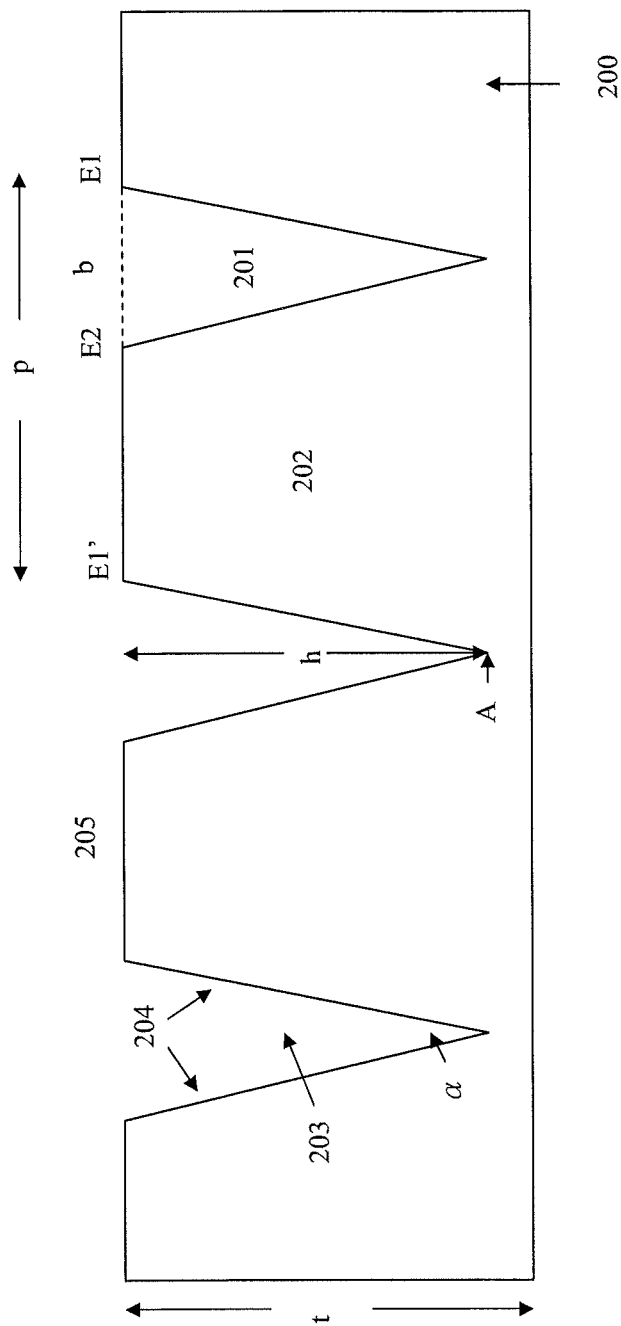
FIG. 2a is a cross-section view of the luminance enhancement structure of the present invention.

The technical term "total internal reflection" used in this application refers to an optical phenomenon that occurs when a ray of light strikes a medium boundary at an angle larger than the critical angle (defined below) with respect to the normal axis to the surface. This can only occur where light travels from a medium with a higher refractive index to one with a lower refractive index.

Generally speaking, when a ray of light crosses a boundary between materials with different refractive indices, the light will be partially refracted at the boundary surface, and partially reflected. However, if the angle of incidence is greater than the critical angle, the light will stop crossing the boundary and instead be totally reflected back.

The critical angle is calculated based on the equation of Snell's law: $C=\sin^{-1}(n2/n1)$ wherein n1 and n2 are the refractive indices of the two different media, with n1 being the higher refractive index and n2 being the lower refractive index.

Unless otherwise stated, the term "substantially equal" or "substantially the same" in this application is intended to refer to the fact that the variances for the parameters (e.g., angles or distances) are within the range of manufacturing tolerances.

II. Display Devices

FIG. 1a illustrates a display device (100). The display device comprises an array of display cells (101) which are filled with a display fluid (102) and sandwiched between two electrode layers (104 and 105). Each of the display cells is surrounded by partition walls (103).

For an electrophoretic display, the display cells are filled with an electrophoretic fluid which comprises charged pigment particles dispersed in a solvent. The display fluid may be a system comprising one or two types of particles.

In the system comprising only one type of particles, the charged pigment particles are dispersed in a solvent of a contrasting color. The charged particles will be drawn to one of the electrode layers (104 or 105), depending on the potential difference of the two electrode layers, thus causing the display device to show either the color of the particles or the color of the solvent, on the viewing side.

In a system comprising particles carrying opposite charges and of two contrasting colors, the particles would move to one electrode layer or the other, based on the charge that they carry and the potential difference of the two electrode layers, causing the display device to show the two contrasting colors, on the viewing side. In this case, the particles may be dispersed in a clear solvent.

The display cells may also be filled with a liquid crystal composition. In addition, it is understood that the present invention is applicable to all types of reflective display devices.

For a segment display device, the two electrode layers (104 and 105) are one common electrode (e.g., ITO) and one patterned segment electrode layer, respectively. For an active matrix display device, the two electrode layers (104 and 105) are one common electrode and an array of thin film transistor pixel electrodes, respectively. For a passive matrix display device, the two electrode layers (104 and 105) are two line-patterned electrode layers. The patterned segment electrode layer (in a segment display device) or the thin film transistor pixel electrodes (in an active matrix display device) may be generally referred to as a "backplane" in a display device, which along with the common electrode drives the display device.

The electrode layers are usually formed on a substrate layer (106) (such as polyethylene terephthalate, PET). The substrate layer may also be a glass layer.

For a microcup-based display device disclosed in U.S. Pat. No. 6,930,818, the content of which is incorporated herein by reference in its entirety, the filled display cells are sealed with a polymeric sealing layer. Such a display device may be viewed from the sealing layer side or the side opposite the sealing layer side, depending on the transparency of the materials used and the application.

III. The Luminance Enhancement Structure

Figure 2B:
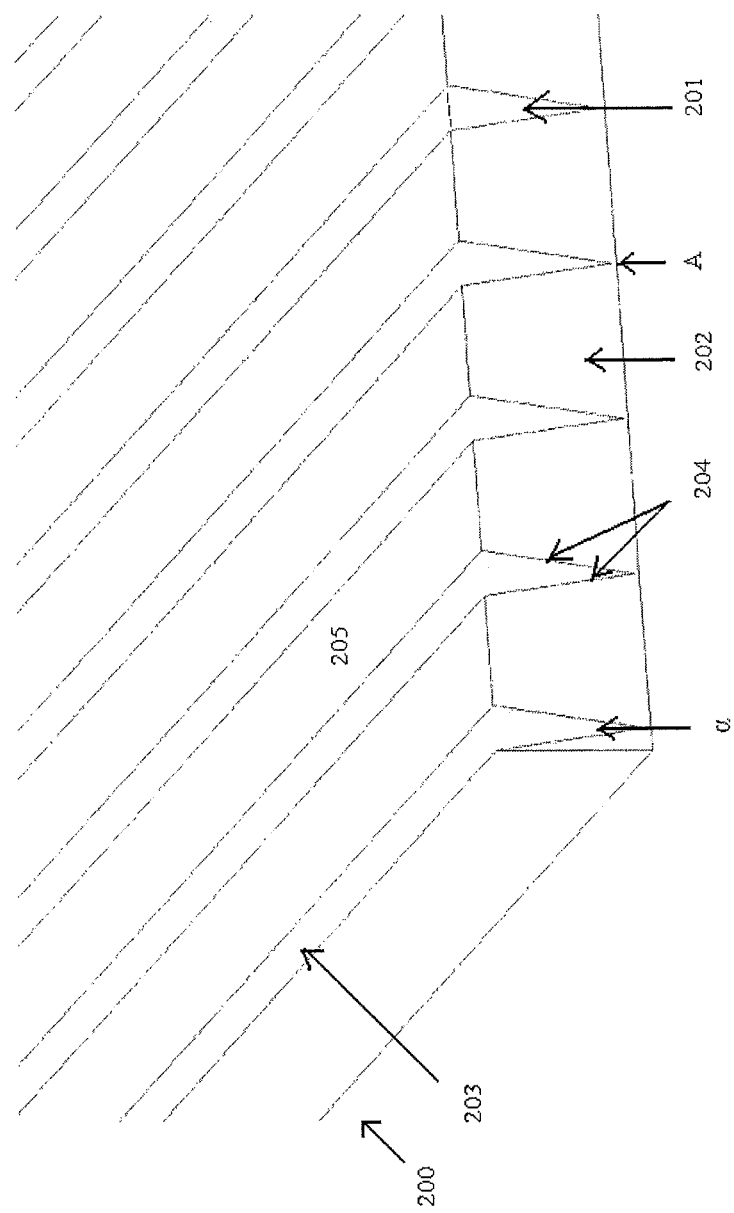
FIG. 2b is a three-dimensional view of the luminance enhancement structure.

FIG. 2a is a cross-section view of the luminance enhancement structure (200) of the present invention. FIG. 2b is a three-dimensional view of the luminance enhancement structure (200). There are multiple columns (202) and grooves (203) across the structure.

The grooves have a triangular cross-section (201), a top angle α and a top point A. The surface (204) of the grooves is optically flat and preferably uncoated. However, it is also possible for the surface (204) to be coated with a metal layer. In the context of this application, the terms "groove" or "grooves" refers to the groove or grooves the surface of which is either uncoated or coated. In one embodiment of the present invention, the surface of the groove or grooves is preferably uncoated.

In one embodiment, the size, shape and configuration of the cross-section of the grooves are substantially the same throughout the structure. More specifically, the top angles of all grooves are substantially equal. The heights ("h") of all grooves are substantially equal. The pitches ("p") of all grooves are also substantially equal. The term "pitch" is defined as the distance between one end point (E1) of the base line (b) of the triangular cross-section of one groove and the corresponding point (E1') of the next groove. In other words, the term "pitch" is the sum of the width of the base line (b) and the width of the top surface of a column between the two grooves.

The columns have a cross section in the shape of a trapezoid (when the top points A of two neighboring grooves are connected). The columns (202) have a top surface (205). The grooves (203) and the columns (202) are in alternating order and in a continuous form in one direction.

The thickness ("t") of the luminance enhancement structure may be in the range of about 10 μm to about 200 μm.

The luminance enhancement structure is formed from a material having a refractive index of about 1.4 to 1.7. The luminance enhancement structure is transparent.

The fabrication of such a luminance enhancement structure is illustrated in a section below.

IV. Display Device with the Luminance Enhancement Structure

FIG. 3 depicts a cross-section view of the luminance enhancement structure on the viewing side of the display device. As shown, the luminance enhancement structure of FIG. 2a (or 2b) has been turned 180°, with the top surface (205) of the columns (202) now in optical contact with the top substrate layer (106T) of the display device, which means that there is no air gap between the top surface 205 and the substrate layer 106T. This may be achieved by an adhesive material, such as the Norland® optical adhesive.

The space within the grooves (203) usually is filled with air. It is also possible for the space to be in a vacuum state. Alternatively, the space in the grooves (203) may be filled with a low refractive index material, lower than the refractive index of the material forming the luminance enhancement structure.

The thickness of the top substrate layer (106T) is usually between about 1 µm to about 175 µm, more preferably between about 1 µm to about 50 µm. In order to achieve the effect of the luminance enhancement structure, the top substrate layer is preferably as thin as possible (e.g., about 1 µm to about 25µ). During formation of a display cell layer on the substrate layer, preferably the substrate layer is adhered to a base layer for mechanical strength and the display cells are formed on the side of the substrate layer. After the display cells are formed, the base layer is removed and a luminance enhancement structure is laminated (optionally with an adhesive layer) to the substrate layer to complete the assembly.

Figure 4:
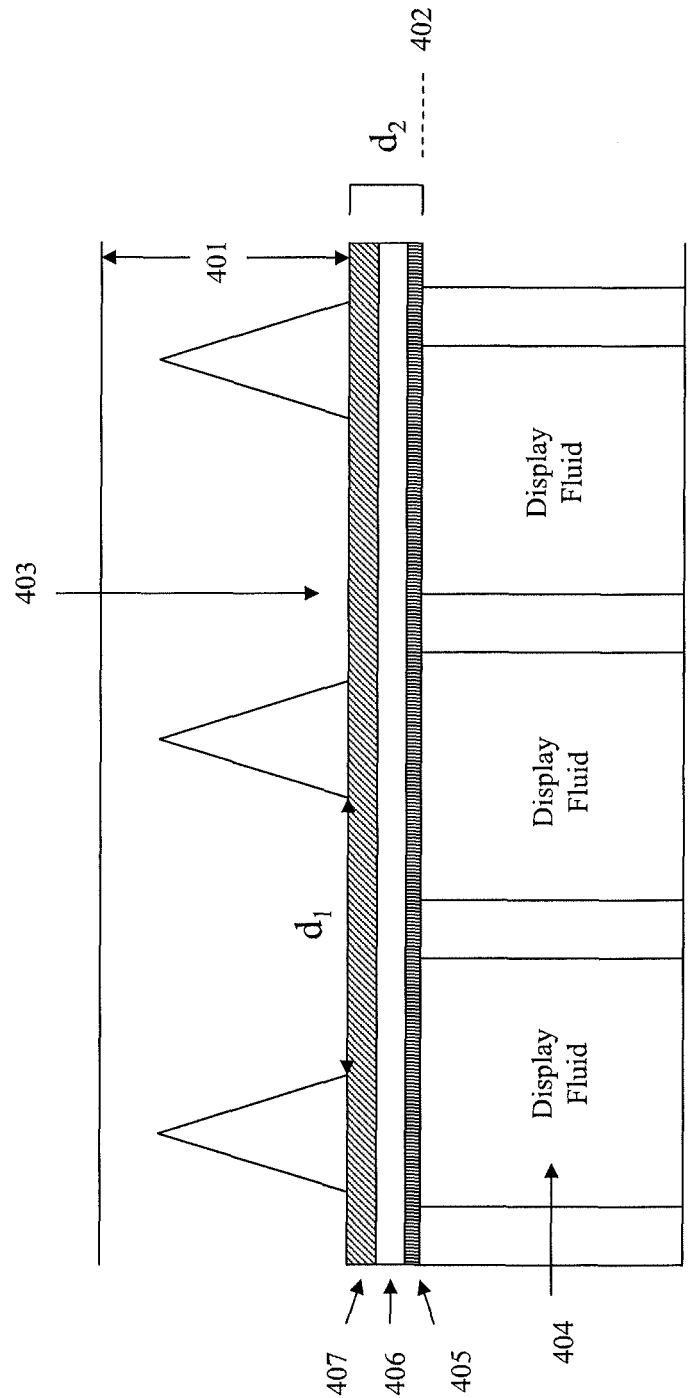
FIG. 4 depicts an embodiment of the present invention which comprises a display device and a luminance enhancement structure on the viewing side of the display device.

FIG. 4 shows an embodiment of the assembly comprising a display device having display cells (404) and a luminance enhancement structure (401) on the viewing side of the display device. In this embodiment, the ratio of the width ($d_1$) of the top surface of the columns (403) to the distance ($d_2$) between the luminance enhancement structure (401) and the top (402) of, the display fluid is at least about 2. It is noted that the distance $d_2$ may comprise an electrode layer (405), the substrate layer (406) and optionally an adhesive layer (407).

V. Dimensions of the Luminance Enhancement Structure

Figure 5B:
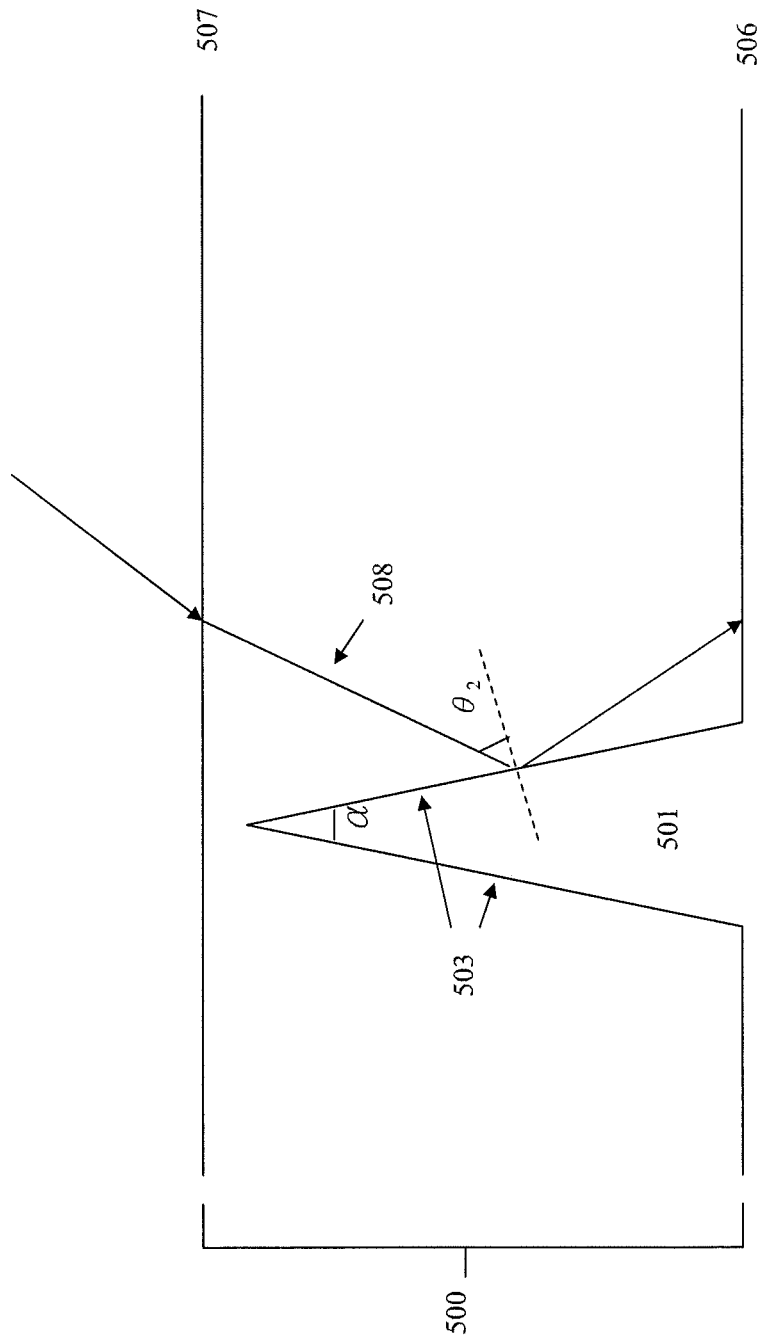
Figure 5C:
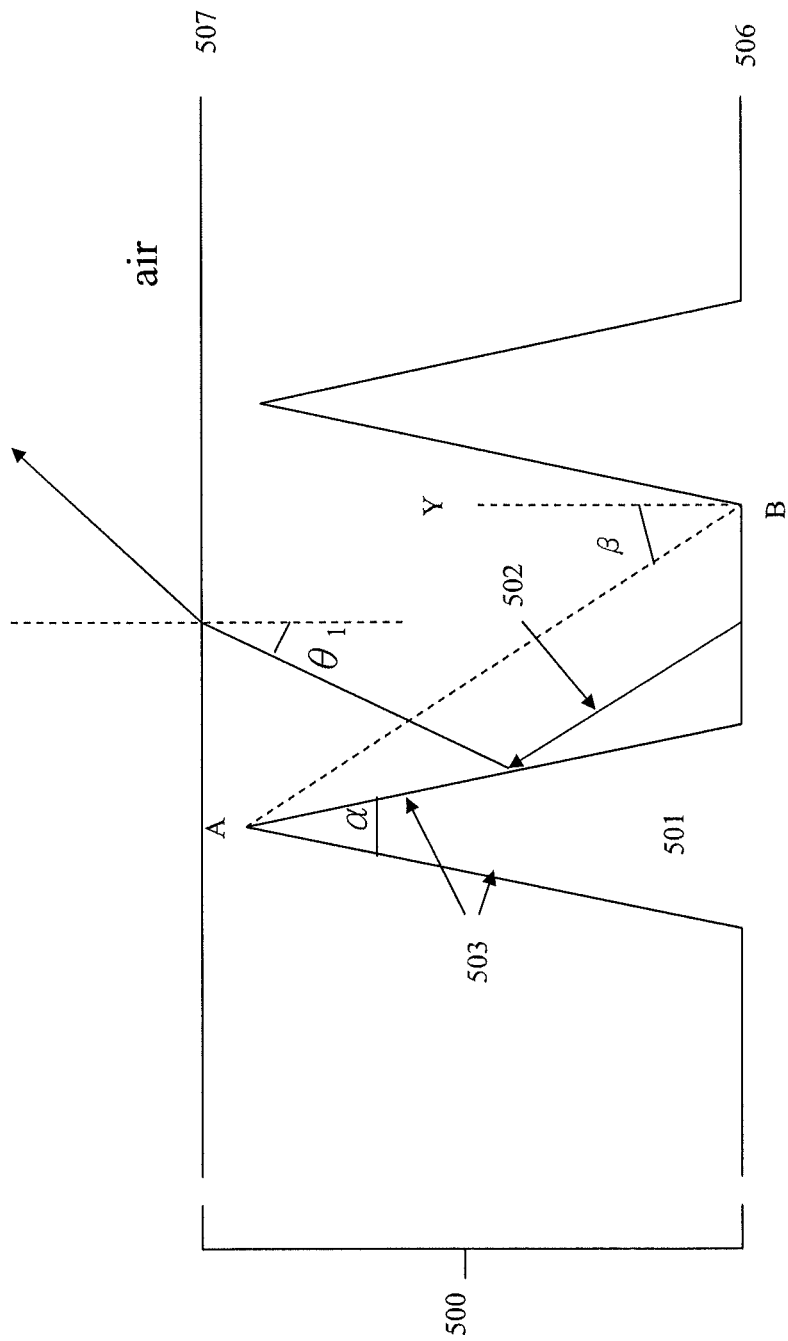

FIGS. 5a-5c illustrate the dimensions of a luminance enhancement structure of the present invention and show how the luminance enhancement structure may enhancement brightness.

In FIG. 5a, it is shown that the design aims to ensure an angle of incidence $\theta_1$ to be smaller than the critical angle $C_1$ (not shown) at the boundary between the top surface (507) of the luminance enhancement structure (500) and air.

The critical angle $C_1$, in this case, is about 42° based on the refractive index of the material for the luminance enhancement structure being 1.5 and the refractive index of air surrounding the top surface of the luminance enhancement structure being 1.

As shown in FIG. 5a, the light (502) scattered from the particles in the display fluid and through the top surface (506) of the display device is reflected at the tilted surface (503) of the groove (501) and reaches the top surface (507) of the luminance enhancement structure (500). In order for the angle of incidence ($\theta_1$) at the top surface of the luminance enhancement structure to be smaller than 42°, the top angle α of the groove (501) is preferably in the range of about 5 to about 50°, more preferably in the range of about 20 to about 40°. As a result, the angle of incidence $\theta_1$ will be smaller than the angle γ, which reduces the chance of total internal reflection at the top surface and increases the overall optical efficiency. The angle γ is an angle at the intersection of the light (502) and the normal axis (marked Y) of the surface (506) of the display device.

An incoming light from a light source transmits through the luminance enhancement structure and strikes the display device and is then reflected with a scattering profile. The scattered light 502 in FIG. 5a is a typical example of such a reflected light.

FIG. 5b demonstrates that the tilted surface (503) of the groove (501) will reflect incoming light by total internal reflection. The design aims to ensure that the light striking the tilted surface (503) of the groove (501) will be reflected instead of transmitting through the space within the groove. The critical angle $C_2$ (not shown) at the boundary between the tilted surface (503) and the space within the groove may be calculated based on the refractive index of the material for the luminance enhancement structure and the refractive index of what is filled in the space of the groove (501). If the groove is unfilled (the refractive index of air being about 1) and the refractive index of the material for the luminance enhancement structure is about 1.5, the critical angle $C_2$ would be about 42°. When the angle of incidence $\theta_2$ of the light (508) coming from the surface (507) is greater than 42°, the light striking the tilted surface (503) will be totally internal reflected towards the boundary 506 which is desired in this case because otherwise, the light would transmit through the space in the groove.

A reflective tilted surface may be achieved by coating a metal layer over the surface of the groove. However, in one embodiment of the present invention, the surface of the grooves is preferably uncoated.

FIG. 5c shows another design parameter, angle β, that needs to be considered. Angle β is the angle at the intersection of two lines, one of which is the line connecting the top point (A) of a first groove and the edge (B) of the base of an adjacent groove and the other line is the normal axis (marked Y) to the surface (506) of the display device. The edge (B) of the base of the adjacent groove is the closest to the first groove.

It is also noted that in a display device with a luminance enhancement structure on its top viewing side, the surface of the display device is in optical contact with the top surface of the columns of the luminance enhancement structure. Therefore the normal axis Y to the surface of the display device is also the normal axis to the top surface of the columns of the luminance enhancement structure.

As shown in FIG. 5c, the angle β preferably is smaller than or equal to the critical angle $C_1$ (not shown) at the boundary between the top surface (507) of the luminance enhancement structure (500) and air. As a result, this will ensure that any light scattered from the top surface (506) of the display device with an angle greater than the critical angle $C_1$ will strike the tilted surface (503). However, in order to reduce light source dependency, β may be greater than $C_1$.

Since the light striking the tilted surface will be reflected as discussed above, the off-axis light may move toward the on-axis direction. In other words, the display device with a luminance enhancement structure of the present invention will be brighter at the on-axis angles by both reducing total internal reflection and utilizing the off-axis light.

However, the luminance enhancement structure is also sensitive to the direction of the light sources. The more light that comes from a greater angle of incidence, the worse the enhancement performance is. Furthermore, the luminance enhancement performance is at the maximum when all of the light sources are at an angle of incidence of 0° from normal.

Although in most cases the direction of light sources cannot be controlled for a display device, generally any light sources coming from above the display device (such as from a ceiling) would provide the desired luminance conditions.

Figure 6:
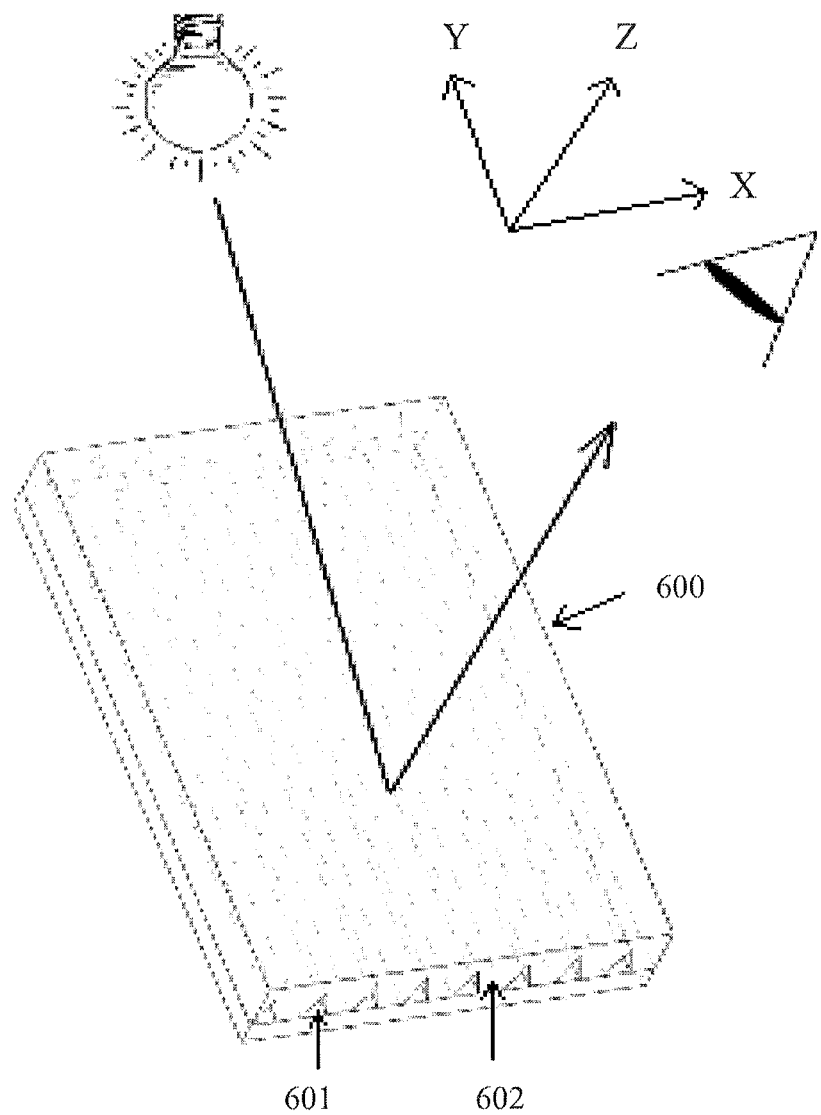
FIG. 6 illustrates the viewing of a display device with the luminance enhancement structure on its viewing surface.

In addition, the dependence on the angle of light sources of the luminance enhancement structure of the present invention may be minimized by setting the structure in a vertical direction. FIG. 6 is a simplified drawing to illustrate this feature.

As shown in FIG. 6, the columns (602) and grooves (601) of the luminance enhancement structure (600) are held in a direction vertical to the viewer facing the display device. In this case, an improved luminance enhancement effect may be achieved with less dependency on the angle of the light sources.

To state differently, when the incoming light is in the Y-Z plane, the enhancement effect will not be dependent on the angle of the incoming light with respect to the Z axis. However, when the incoming light is in the X-Z plane, the enhancement effect will be dependent on the angle of the incoming light with respect to the Z axis. This is a unique feature of the luminance enhancement structure of the present invention (in which the columns and grooves are in a continuous form in one direction) and fits most reading conditions.

The luminance enhancement structure (600) is on the viewing side of a display device.

VI. Fabrication of the Luminance Enhancement Structure

The luminance enhancement structure may be fabricated in many different ways.

Figure 7A:
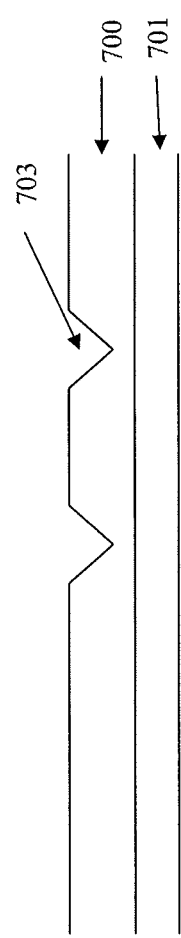

In one embodiment, the luminance enhancement structure may be fabricated separately and then laminated over the viewing side of the display device. For example, the luminance enhancement structure may be fabricated by embossing as shown in FIG. 7a. The embossing process is carried out at a temperature higher than the glass transition temperature of the embossable composition (700) coated on a substrate layer (701). The embossing is usually accomplished by a mold which may be in the form of a roller, plate or belt. The embossable composition may comprise a thermoplastic, thermoset or a precursor thereof. More specifically, the embossable composition may comprise multifunctional acrylate or methacrylate, multifunctional vinylether, multifunctional epoxide or an oligomer or polymer thereof. The glass transition temperatures (or Tg) for this class of materials usually range from about −70° C. to about 150° C., preferably from about −20° C. to about 50° C. The embossing process is typically carried out at a temperature higher than the Tg. A heated mold or a heated housing substrate against which the mold presses may be used to control the embossing temperature and pressure. The mold is usually formed of a metal such as nickel. The hardening of the embossable composition may be accomplished by cooling, solvent evaporation, cross-linking by radiation, heat or moisture.

The mold is preferably manufactured by the diamond turning technique. Typically the mold is made by diamond turning technique on a cylindrical blank known as a roll. The surface of the roll is typically of hard copper, although other materials may be used. The pattern on the mold (roll) is the opposite of the intended luminance enhancement structure. In other words, the roll will show sharp protruding patterns which are corresponding to the grooves of the luminance enhancement structure. The pattern on the roll is formed in a continuous manner around the circumference of the roll. In a preferred embodiment, the indentations on the surface of the roll are produced by a technique known as thread cutting. In thread cutting, a single, continuous indentation is cut on the roll while the diamond cutter is moved in a direction transverse to the turning roll. If the mold to be produced has a constant pitch, during manufacture of the mold, the roll will move at a constant velocity. A typical diamond turning machine will provide independent control of the depth that the cutter penetrates the roll, the horizontal and vertical angles that the cutter makes to the roll and the transverse velocity of the cutter.

As shown in FIG. 7a, the mold creates the grooves (703) and is released during or after the embossable composition is hardened. The hardening of the embossable composition may be accomplished by cooling, solvent evaporation, cross-linking by radiation, heat or moisture.

The refraction index of the material for forming the luminance enhancement structure is preferably greater than about 1.4, more preferably between about 1.5 and about 1.7.

The luminance enhancement structure may be used as is or further coated with a metal layer.

Figure 7B:
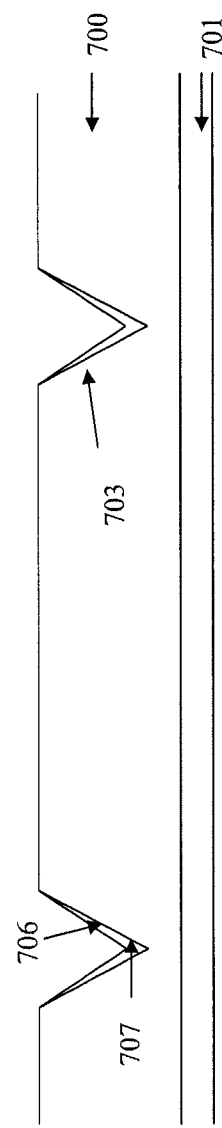

The metal layer (707) is then deposited over the surface (706) of the grooves (703) as shown in FIG. 7b. Suitable metals for this step may include, but are not limited to, aluminum, copper, zinc, tin, molybdenum, nickel, chromium, silver, gold, iron, indium, thallium, titanium, tantalum, tungsten, rhodium, palladium, platinum and cobalt. Aluminum is usually preferred. The metal material must be reflective, and it may be deposited on the surface (706) of the grooves, using a variety of techniques such as sputtering, evaporation, roll transfer coating, electroless plating or the like.

In order to facilitate formation of the metal layer only on the intended surface (i.e., the surface 706 of the grooves), a strippable masking layer may be coated before metal deposition, over the surface on which the metal layer is not to be deposited. As shown in FIG. 7c, a strippable masking layer (704) is coated onto the surface (705) between the openings of the grooves. The strippable masking layer is not coated on the surface (706) of the grooves. The coating of the strippable masking layer may be accomplished by a printing technique, such as flexographic printing, driographic printing, electrophotographic printing, lithographic printing, gravure printing, thermal printing, inkjet printing or screen printing. In this case, the printing ink is in contact with the flat surface 705, so no additional patterning is required.

The coating may also be accomplished by a transfer-coating technique involving the use of a release layer. The strippable masking layer preferably has a thickness in the range of about 0.01 to about 20 microns, more preferably about 1 to about 10 microns.

For ease of stripping, the layer is preferably formed from a water-soluble or water-dispersible material. Organic materials may also be used. For example, the strippable masking layer may be formed from a re-dispersible particulate material. The advantage of the re-dispersible particulate material is that the coated layer may be easily removed without using a solubility enhancer. The term "re-dispersible particulate" is derived from the observation that the presence of particles in the material in a significant quantity will not decrease the stripping ability of a dried coating and, on the contrary, their presence actually enhances the stripping speed of the coated layer.

The re-dispersible particulate consists of particles that are surface treated to be hydrophilic through anionic, cationic or non-ionic functionalities. Their sizes are in microns, preferably in the range of about 0.1 to about 15 um and more preferably in the range of about 0.3 to about 8 um. Particles in these size ranges have been found to create proper surface roughness on a coated layer having a thickness of <15 um. The re-dispersible particulate may have a surface area in the range of about 50 to about 500 $m^2/g$, preferably in the range of about 200 to about 400 $m^2/g$. The interior of the re-dispersible particulate may also be modified to have a pore volume in the range of about 0.3 to about 3.0 ml/g, preferably in the range of about 0.7 to about 2.0 ml/g.

Commercially available re-dispersible particulates may include, but are not limited to, micronized silica particles, such as those of the Sylojet series or Syloid series from Grace Davison, Columbia, Md., USA.

Non-porous nano sized water re-dispersible colloid silica particles, such as LUDOX AM can also be used together with the micron sized particles to enhance both the surface hardness and stripping rate of the coated layer.

Other organic and inorganic particles, with sufficient hydrophilicity through surface treatment, may also be suitable. The surface modification can be achieved by inorganic and organic surface modification. The surface treatment provides the dispensability of the particles in water and the re-wetability in the coated layer.

In FIG. 7d, a metal layer (707) is shown to be deposited over the entire surface, including the surface (706) of the grooves and the surface (705) between the grooves. Suitable metal materials are those as described above. The metal material must be reflective and may be deposited by a variety of techniques previously described.

Figure 7E:
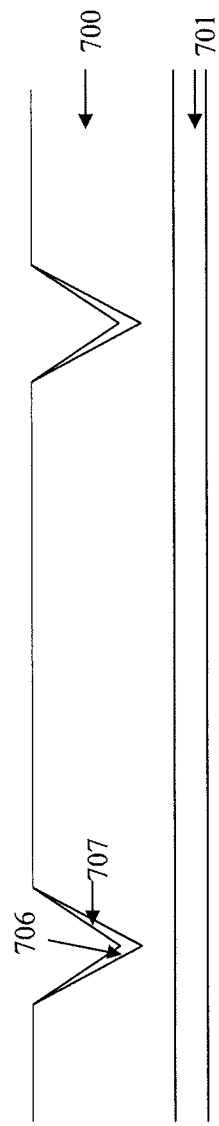

FIG. 7e shows the structure after removal of the strippable masking layer (704) with the metal layer 707 coated thereon. This step may be carried out with an aqueous or non-aqueous solvent such as water, MEK, acetone, ethanol or isopropanol or the like, depending on the material used for the strippable masking layer. The strippable masking layer may also be removed by mechanical means, such as brushing, using a spray nozzle or peeling it off with an adhesive layer. While removing the strippable masking layer (704), the metal layer (707) deposited on the strippable masking layer is also removed, leaving the metal layer (707) only on the surface (706) of the grooves.

Figure 7F:
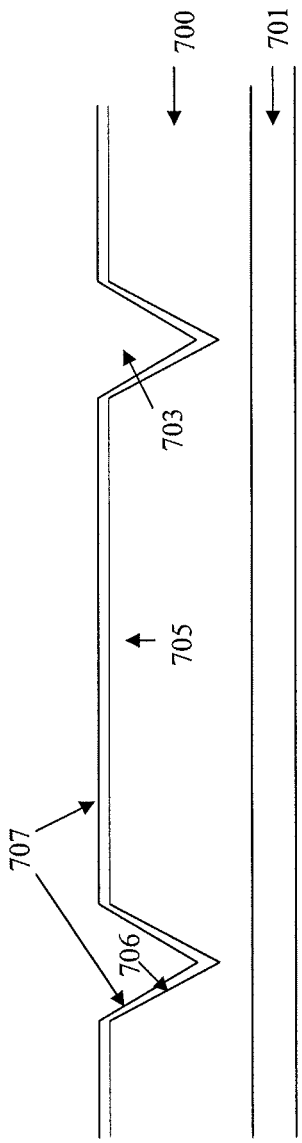
Figure 7G:
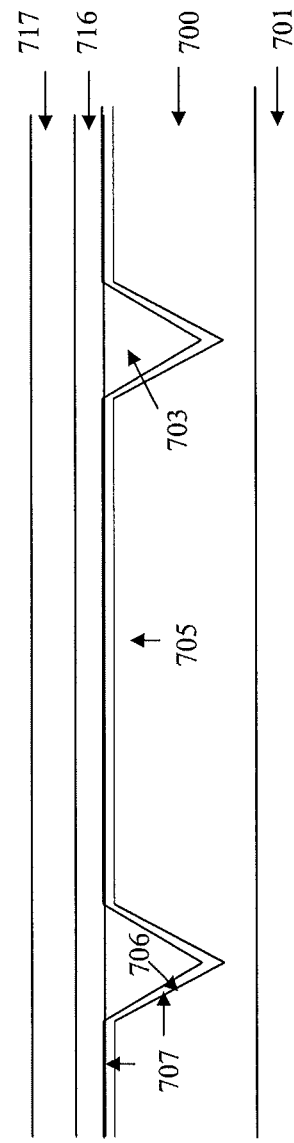

FIGS. 7f and 7g depict an alternative process for depositing the metal layer. In FIG. 7f, a metal layer (707) is deposited over the entire surface first, including both the surface (706) of the grooves and the surface (705) between the grooves. FIG. 7g shows that the film of grooves deposited with a metal layer (707) is laminated with a film (717) coated with an adhesive layer (716). The metal layer (707) on top of the surface (705) may be conveniently peeled off when the film of grooves is delaminated (separated) from the adhesive layer (716) coated film (717). The thickness of the adhesive layer (716) on the adhesive coated film is preferably in the range of about 1 to about 50 um and more preferably in the range of about 2 to about 10 um.

The luminance enhancement structure comprising grooves (uncoated or coated with a metal layer) is then laminated over a layer of display cells as described above.

Figure 8A:
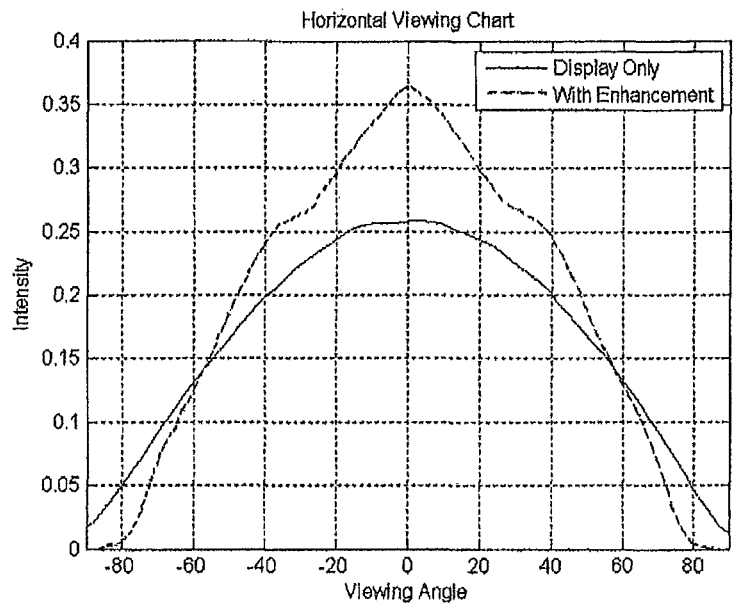
FIGS. 8a and 8b show simulation data of the luminance enhancement structure.
Figure 8B:
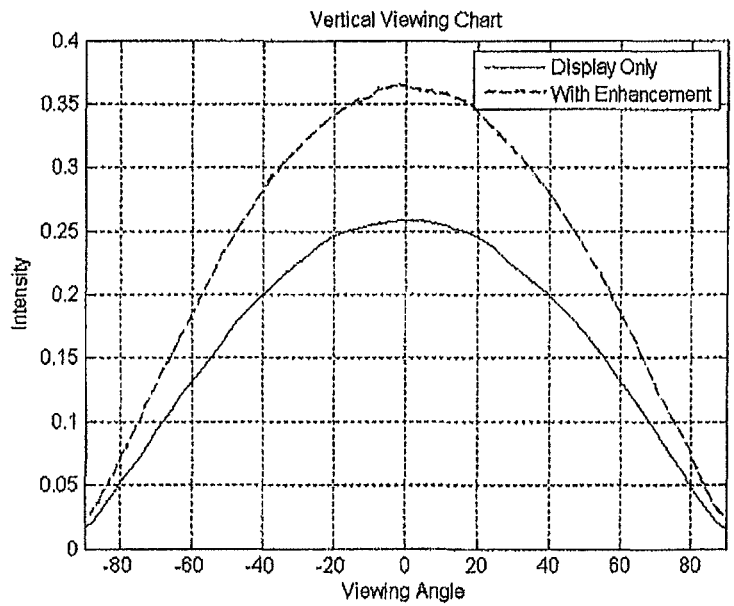

FIGS. 8a and 8b are simulation data showing how the intensity of a display device is enhanced both horizontally (FIG. 8a) and vertically (FIG. 8b). The solid lines are the brightness of a display device without the luminance enhancement structure and the dotted lines are the brightness of a display device with the luminance enhancement structure.

In a display device assembly with a luminance enhancement structure, color filters may also be employed. The color filters may be placed on top of the luminance enhancement structure or placed between the luminance enhancement structure and a display panel.

The combined use of a luminance enhancement structure and color filters has many advantages.

For example, the presence of the color filters alone usually will cause a significant loss of light energy. The presence of the luminance enhancement structure, however, can help to compensate the effect of such loss and provide improved on-axis brightness.

Secondly, when a display device with color filters is viewed from an oblique direction, a color disregistration will occur due to parallax. The presence of a luminance enhancement structure, especially when the color filters are on top of the luminance enhancement structure, may reduce the color disregistration phenomenon because the luminance enhancement structure can re-direct the off-axis light toward on-axis.

In addition, there are dead spots between color filters of different colors. When the luminance enhancement structure is used, the grooves of the structures may be aligned with the dead spots and the dead spots could be hidden underneath the grooves, thus effectively increasing the aperture ratio of the display device.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A reflective display assembly comprising:
   (a) a display device comprising display cells and a top substrate layer on the viewing side of the display device;
   (b) a luminance enhancement structure on top of the display device on the viewing side of the display device, said luminance enhancement structure comprises
      i) a top surface,
      ii) grooves and columns, wherein each of said grooves has a triangular cross-section with a tilted surface, a top point and a top angle, and said grooves and columns are in alternating order and in continuous form only in one direction; and
   (c) color filters,
   whereby an incoming light from a light source on the viewing side of the display device transmits through the luminance enhancement structure, strikes the display device, and the light reflected from the display device and the tilted surface of the grooves reaches the top surface of the luminance enhancement structure.

2. The display assembly of claim 1, wherein the top angles of the grooves are substantially equal.

3. The display assembly of claim 1, wherein each of said columns has a top surface which is in optical contact with said top substrate layer.

4. The display assembly of claim 3, wherein said top substrate layer has a thickness in the range of about 1 μm to about 175 μm.

5. The display assembly of claim 4, wherein said top substrate layer has a thickness in the range of about 1 μm to about 25 μm.

6. The display assembly of claim 2, wherein said top angle is in the range of about 5° to about 50°.

7. The display assembly of claim 6, wherein said top angle is in the range of about 20° to about 40°.

8. The display assembly of claim 1, wherein the titled surface of the grooves is uncoated.

9. The display assembly of claim 1, wherein said luminance enhancement structure comprises an angle β which is smaller than a critical angle at the boundary between the top surface of the luminance enhancement structure and air, wherein said angle β is an angle formed at the intersection of (i) a line connecting the top point of a first groove to an edge of the base of an adjacent groove, wherein said edge of the base of the adjacent groove is the closest to the first groove, and (ii) a normal axis of the top surface of the column.

10. The display assembly of claim 1, wherein the color filters are on top of the luminance enhancement structure.

11. The display assembly of claim 10, wherein the ratio of the width of the top surface of each of the columns to the distance between the luminance enhancement structure and the top of a display fluid in the display cells is at least about 2.

12. The display assembly of claim 1, wherein the color filters are placed between the luminance enhancement structure and the display device.

13. The display assembly of claim 12, wherein there are dead spots between the color filters and the grooves of the luminance enhancement structures are aligned with the dead spots.

14. The display assembly of claim 1, wherein the display cells are sandwiched between a common electrode layer and a backplane.

15. The display assembly of claim 1, wherein the display device is in an X-Y plane, the columns and grooves are in the Y direction, and the light source is in a Y-Z plane.

* * * * *